May 19, 1953     H. C. BRUMBAUGH     2,639,185
COLLAPSIBLE TRAILER

Filed Jan. 12, 1951     3 Sheets-Sheet 1

INVENTOR.
HAROLD C. BRUMBAUGH
BY Buckhorn and Cheatham
Attorneys

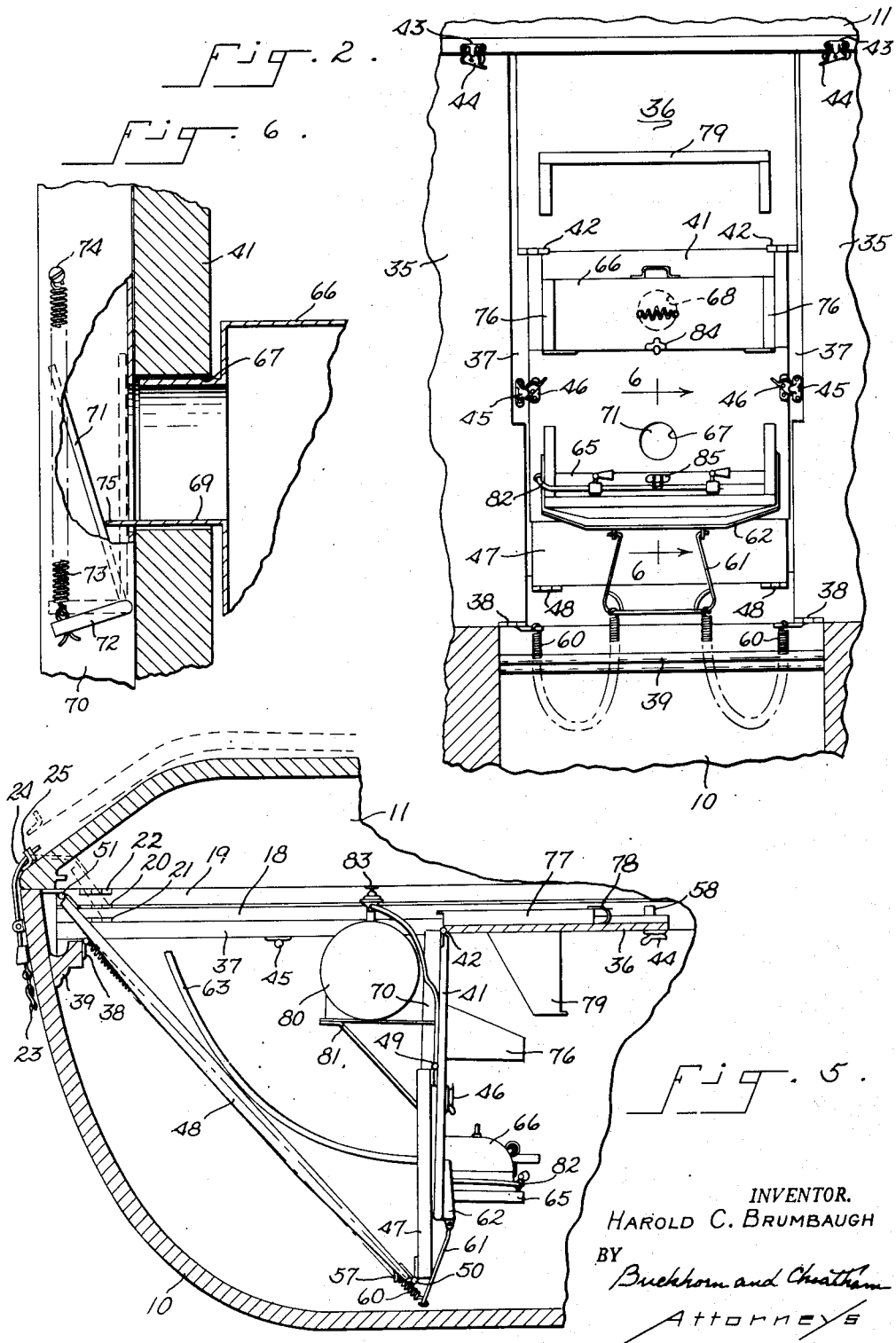

May 19, 1953 H. C. BRUMBAUGH 2,639,185
COLLAPSIBLE TRAILER
Filed Jan. 12, 1951 3 Sheets-Sheet 3
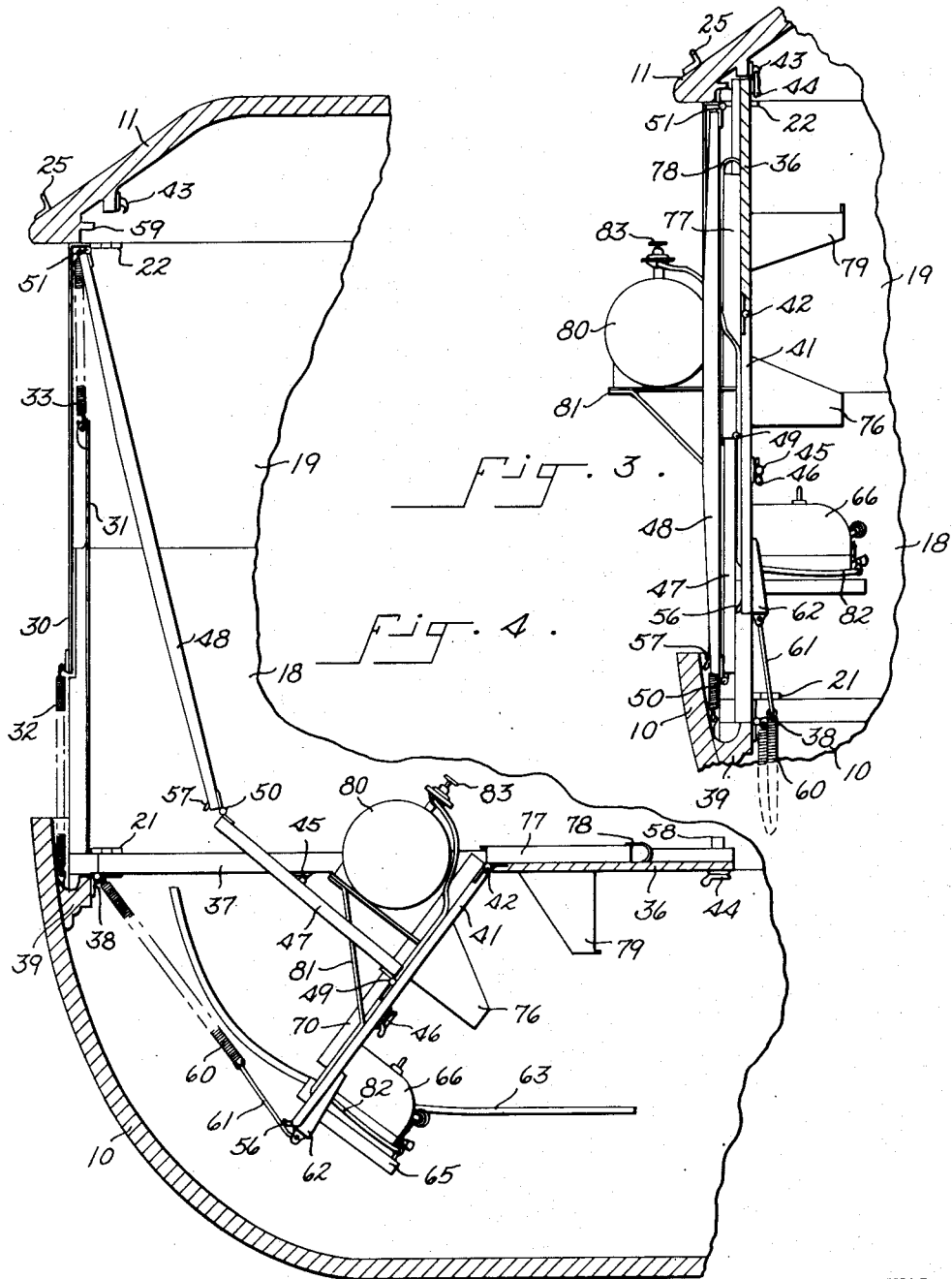
INVENTOR.
HAROLD C. BRUMBAUGH
BY Buckhorn and Cheatham
Attorneys Patented May 19, 1953

2,639,185

UNITED STATES PATENT OFFICE 2,639,185

COLLAPSIBLE TRAILER

Harold C. Brumbaugh, Portland, Oreg., assignor of one-third to Max E. Krueger and one-third to Herbert Heltzel, both of Portland, Oreg.

Application January 12, 1951, Serial No. 205,708

13 Claims. (Cl. 296—23)

The present invention relates to a collapsible trailer, particularly a trailer of relatively small size when collapsed so that it may be towed over any terrain which an automobile may traverse, without endangering the occupants of the automobile as would be the case with a large trailer subject to wind forces and other dangers. The trailer is substantially as illustrated and described in my Patent No. 2,518,278, issued August 8, 1950, and may be provided with a plurality of collapsible bunks as fully illustrated and claimed in my co-pending application Serial No. 791,574, filed December 13, 1947, now Patent No. 2,553,297, issued May 15, 1951. The trailer of the foregoing patent comprises a box-like base section, a roof section adapted to be collapsed onto the base section or raised into an elevated position, inwardly foldable side walls, and end walls which are adapted to move from upright positions between the ends of the side walls to inwardly extending horizontal positions. The front end wall may mount a burner and other appliances while the rear end wall is partially articulated to provide a door, the box-like base section also having a hinged section co-operating with the door to permit access to the interior of the trailer. In the foregoing patent, a stabilizer is illustrated and claimed, the stabilizer operating to prevent sidesway of the roof section and side walls when they are elevated prior to their being locked in upright position by the end walls. The present invention is primarily concerned with an improvement in the front end wall and the stabilizer means associated therewith.

An object of the present invention is to provide a structure of the foregoing character which may be transformed from its collapsed to its opened condition by almost anyone including fairly young children or relatively weak adults, this object being accomplished by providing spring means associated with the stabilizer and front end wall which are placed under tension or loaded when the trailer is fully collapsed, said spring means operating to initiate elevation of the roof section upon releasing locking means provided to hold the trailer in collapsed condition during travel.

A further object of the present invention is to provide a trailer of the foregoing character including an end wall upon which a burner appliance suitable for cooking or heating purposes may be mounted, together with an externally positioned fuel supply tank affixed to the structure and foldable within the trailer during movement, the apparatus being such that the valve for permitting fuel to flow from the fuel tank to the burner appliance may be operated without requiring a person to go outside of the trailer during inclement weather.

The foregoing and other objects and advantages of the present invention will be more fully ascertained from inspection of the following specification taken in connection with the accompanying drawings wherein like numerals refer to like parts throughout.

In the drawings,

Fig. 2 is a partial view of the interior of the front end of the trailer when in opened condition;

Fig. 3 is a partial vertical section taken through the front wall of the trailer substantially along the line 3—3 of Fig. 1;

Fig. 4 is a more complete vertical section similar to Fig. 3 showing the roof section elevated and the side walls upright but with the front end wall in its lowered, inwardly directed horizontal position and the stabilizer in its extended position;

Fig. 5 is a sectional view taken substantially along the same plane as Fig. 3 showing the front end wall and stabilizer in their fully collapsed positions with the roof section lowered onto the base section and locked in position; and Fig. 6 is a vertical section on an enlarged scale taken substantially along line 6—6 of Fig. 2.

Figure 1:
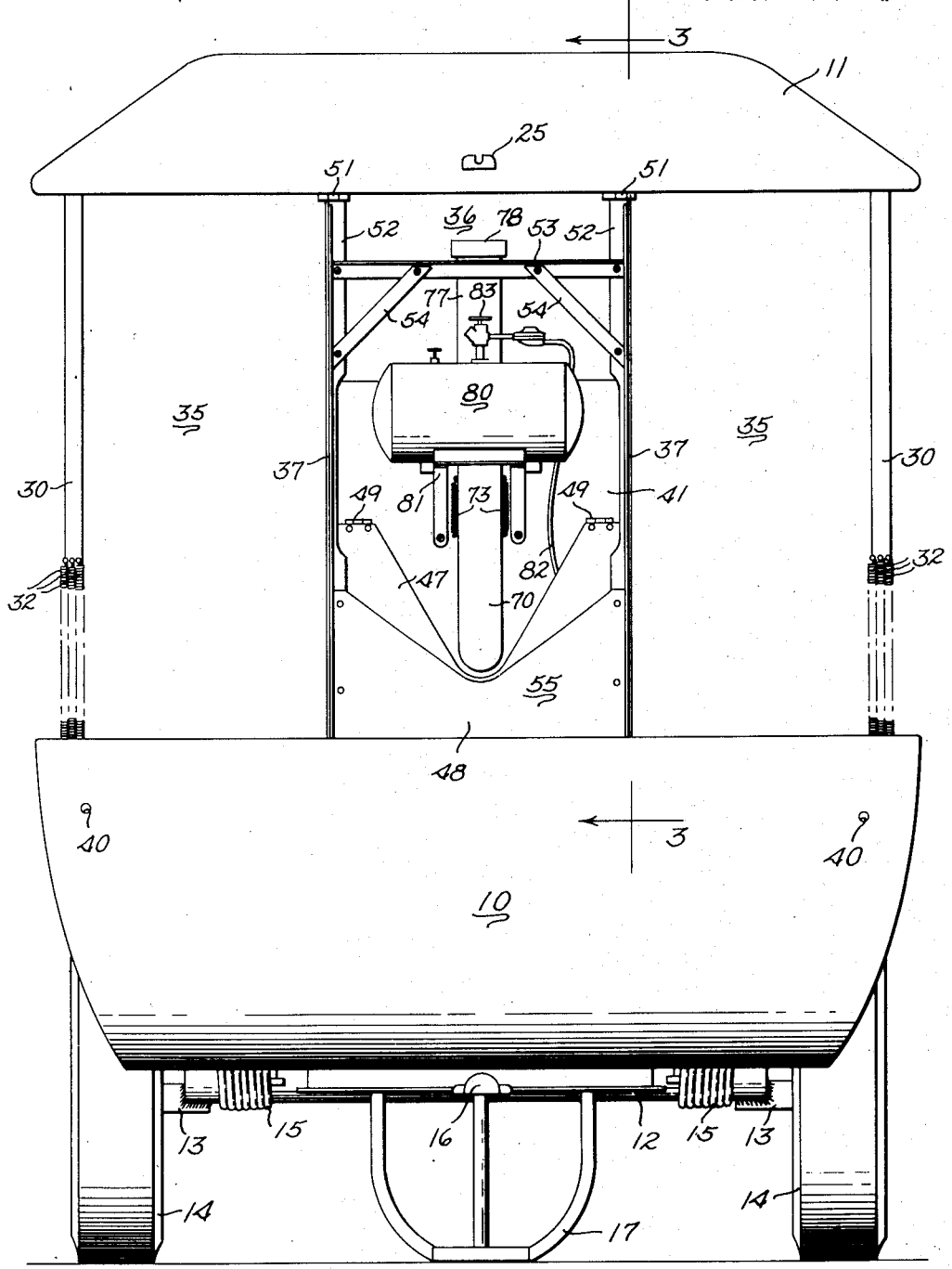
Fig. 1 is a front end view of the trailer in opened condition.

The trailer comprises a base section 10 of box-like character, a roof section 11 adapted to co-operate with the base section to provide a closed structure of low silhouette for travelling, or to be raised to an elevated position of sufficient height to permit persons to move about within the trailer.

The base section is supported upon a single axle 12, preferably of the type having offset spindle portions 13 upon which wheels 14 are mounted, the wheels being held in proper position by torsion springs 15. A drawbar 16 is provided at the front end for towing purposes, and collapsible pedestals 17 are provided at each end in order that the trailer may rest in stable condition when occupied or when separated from the towing vehicle. The side walls of the base section and the side edges of the roof section are connected together by horizontally articulated side walls including lower sections 18 and upper sections 19 hinged together by hinges 20, the lower section being hinged to the base section by hinges 21 and the upper section being hinged to the roof section by hinges 22. When the roof is fully elevated the side wall sections 18 and 19 are aligned with each other in upright condition, and when the roof is collapsed the side walls fold inwardly into the trailer. When the side walls are upright, the end walls may be swung from their horizontally disposed, inwardly directed positions to upright positions in order to complete the trailer structure. The pedestals 17 may be collapsed and swung upwardly against the bottom of the base section 10, being held in such position by suitable means such as a chain 23 and an articulated locking device 24 adapted to engage a cleat 25 mounted on the roof section. Details of the trailer as so far described may be ascertained from the aforementioned Patent No 2,518,278. Included in the structure claimed in the foregoing patent are spring means for elevating the roof structure and side walls after an initial elevating movement has been manually imparted thereto, such means comprising an extension lever 30 extending downwardly from each end of the upper wall section 19, an extension lever 31 extending upwardly from each end of the lower wall section 18, lower elevating springs 32 tensioned between the lower ends of the extension levers 30 and the base section 10, and upper elevating springs 33 tensioned between the upper ends of the levers 31 and the roof section 11, the springs being operable to raise the roof section as described in the aforesaid application. Until the end walls are elevated to lock the side walls in position there would be some danger of the structure collapsing sideways were it not for a stabilizer such as provided in the above-identified patent, or as provided in an improved form in the present application. It is contemplated that the rear wall of the trailer, in which is located the access door, shall remain as described in the aforesaid patent. The present invention is an improvement in the front wall structure, to which access may be had when the trailer is entered after the rear wall is elevated and the door opened.

The front end wall comprises side portions 35 which extend the full height between the base and roof sections and which are connected together by an upper central portion 36, the structure being braced by a pair of bars 37 defining the inner edges of the side portions 35. The lower ends of the bars 37 are hinged to the base section by hinge means such as illustrated at 38, the hinges 38 being preferably mounted on the rim of a gutter 39 extending along the inside surface of the front of the base section 10 for leading water to the outside of the trailer through drain openings 40. The hinges 38 are so arranged that the end wall may be folded into the trailer to lie in an inwardly directed, horizontal position as illustrated in Figs. 4 and 5, or may be raised to an upright position as illustrated in Figs. 1, 2 and 3. The substantial opening framed by the lower edge of the upper portion 36 and the inner surfaces of the bars 37 is substantially closed by a flap 41 hinged to the lower edge of the portion 36 by hinges 42. The hinges 42 are so arranged that the flap may lie in the plane of the panels 35 and 36 as illustrated in Figs. 1, 2 and 3, or may depend from the horizontally positioned end wall as illustrated in Figs. 4 and 5. When the end wall is raised into its upright position it may be locked in position by separable fasteners such as window catch hooks 43 mounted on the roof section and cooperative latches 44 mounted on the end wall. When the wall is positioned upright the flap 41 may be locked in the plane of the wall by separable fastening means such as catches 45 mounted on the bars 37 and cooperating latches 46 mounted on the flap. As seen in the Figs. 2 and 3 the flap 41 is not of sufficient length completely to close the opening in the end wall, but other means are provided to substantially close the lower end of the opening.

The flap 41 is an element of an articulated structure acting as a stabilizer when the roof is initially raised and cooperating with spring means to give the initial impetus to the roof when the trailer is first opened. The articulated structure comprises a first link member 47 and a second link member 48. The first link member is pivotally connected to the flap 41 by horizontally disposed hinge means 49 located at an intermediate point along the length of the flap 41, the hinges being so arranged as to permit the first link member to swing outwardly to a position normal to the flap 41 as seen in Fig. 4 or to lie against the outer surface of the flap 41 as seen in Fig. 5. The first link member is of sufficient length to extend beyond the lower edge of the flap 41 beneath the level of the rim of the base section 10 as seen in Fig. 3, but is not so long as to strike the floor of the base section 10 when the trailer is collapsed, as seen in Fig. 5. The outer end of the link member 47 is connected to the inner or lower end of link member 48 by horizontally disposed hinge means 50, and the upper end of the link member 48 is connected to the edge of the roof section 11 by horizontally disposed hinge means 51. The various members forming the articulation including flap 41 and link members 47 and 48 are of substantial width and centrally located along the rear wall with the hinge means being widely disposed so as to prevent lateral sway of the roof and side walls when extended. The roof is thus guided to move in a strictly vertical sense with respect to the base section. The various hinge means 42, 49, 50 and 51 are all horizontally disposed and so arranged that the articulated structure may collapse upon itself as seen in Fig. 3 when the roof is elevated and the end wall elevated, or may move to relatively extended positions when the roof is elevated and the end wall lowered as seen in Fig. 4, or may be partially collapsed when the trailer is completely closed as seen in Fig. 5. The link members, particularly the link member 48, is a very sturdy structure comprising longitudinal bars 52 connected by a crossbrace 53 braced by diagonal braces 54, and further connected together by a rigid sheet 55 extending across their lower ends to complete the wall structure. Various overlapping flanges and weather-stripping means or the like are provided between the edges of the various members such as between the bars 52 and 37, such means not being shown as being within the skill of the ordinary mechanic. The link 47 comprises side bars connected together by a rigid sheet of metal further completing the end wall. The lower edge of the flap 41 is provided with an outwardly directed flange 56 adapted to contact the inner surface of the link member 47 as seen in Fig. 3 when the end wall is raised thereby to seal the space between two members, and the lower edge of the sheet 55 is provided with an outwardly directed flange 57 for sealing the space between the link 48 and the base section 10. A weather-stripping bead 58 is preferably provided along the upper edge of the end wall which engages beneath the weather-stripping flange 59 on the roof section. The articulated structure therefore completes the end wall and provides a weatherproofed trailer suitable for use in rigorous weather.

As more fully illustrated and described in the above-identified application, the springs 32 and 33, attached to the extension levers 30 and 31, provide force sufficient to elevate the roof and side walls after an initial impetus has been manually imparted thereto. When the trailer is collapsed the extension levers 30 and 31 lie parallel to each other with the springs most fully tensioned and the pull of the springs is in the direction of the levers, hence no opening component of force is provided until the levers are angularly disposed with respect to each other in scissors fashion. The present invention provides means for initially displacing the roof and wall sections so as to cause the extension levers to be angularly disposed and permit the springs 32 and 33 to continue the raising movement. Such initial movement is imparted to the roof by spring means which are loaded or tensioned when the roof is fully collapsed against the base section. The spring means comprise a pair of long tension springs 60 fastened to the gutter 39 on the base section 10 at one end, and to a bail 61 depending from an angle bar 62 fixed to the lower end of the flap 41. When the end wall is fully raised, the springs hang loosely within the front of the base section 10 as illustrated in Figs. 2 and 3. When the end wall is lowered and the roof is in its raised position the weight of the flap 41 and attached appliances or the like causes the springs 60 to be initially stretched in the manner shown in Fig. 4 with the bail 61 extending forwardly and upwardly across the lower edge of the flap 41. When the roof is lowered the link 48 forces the link 47 against the outer surface of the flap 41, and thereafter forces the link and flap together into the upright depending position illustrated in Fig. 5. In moving to this position the lower edge of the link 47 has depressed the bail 50 and maximum tension is imparted to the springs 60. When the roof is thus lowered it requires a slight manual force to depress the front edge thereof from the position illustrated in dash lines in Fig. 5 to its fully closed position, after which the articulated fastener 24 at the end of the chain 23 may be operated firmly to hold the two sections together. When it is desired to raise the roof the articulated fastener member 24 is disengaged, and whatever other fastening means (not shown) may be provided to hold the roof in closed position are also disengaged, whereupon the springs 60 will immediately force the front end of the roof upwardly. As soon as the front end of the roof is forced upwardly the rear end follows, thereby causing both sets of extension levers at the front and rear of the trailer to assume their angular relation with respect to ech other at which the elevating springs 32 and 33 become effective. Therefore, the roof rises in one continuous movement until the walls are in upright condition. At this moment the various parts assume the relationship illustrated in Fig. 4. The rear wall of the trailer may now be raised and the door opened, permitting a person to walk into the trailer. Guide bars 63 are preferably mounted on the aisle defining structure of the trailer to lessen frictional resistance to opening and closing movement, the guide bars engaging the side edges of the various members which come in contact therewith to guide the members.

The lower inside surface of the flap 41 supports a burner appliance 65 of suitable nature for heating and cooking purposes. The appliance preferably comprises a detachable hood 66 adapted to fit over the burners of the appliance as will appear. The flap 41 is provided with a pair of vertically disposed openings 67 and 68 the lower one being illustrated in full outline in Fig. 2 and the upper one in dotted outline. The hood 66 is provided with a lateral, cylindrical extension 69 which is relatively short but of sufficient length to extend through the flap 41 and which fairly snugly fits the opening 67 or 68. A vertical flue 70 is mounted upon the outer surface of the flap 41 and is provided with a pair of openings in alignment with the openings 67 and 68. Each of the openings is normally closed by a damper 71 mounted within the flue and attached to a rocker arm 72 pivotally extending transversely through the flue. Each end of the rocker arm is directed forwardly and anchors one end of a spring 73 connected to the side of the flue by a screw 74. The extension 69 is provided at its lower edge with a finger 75 which engages the damper 71 and forces it to an open position when the hood is associated with the adjacent opening in the flap 41, the other damper remaining closed. When the hood is in its lower position engaged with the opening 67 its edges rest upon the burner appliance 65. The burner appliance is built in the fashion of such devices so as to have air inlet openings in its bottom surface for permitting access of combustion-supporting air to the burners. The hood, when in such position, acts as a radiator which is of sufficient capacity to heat the interior of the trailer. When the burner appliance is to be used for cooking purposes, the hood is disengaged from the opening 67 and engaged with the opening 68 as seen in Fig. 2, thereby causing the lower opening to close and opening the upper damper. The hood is supported at its upper position by a pair of mounting brackets 76 extending inwardly from the front of the flap 41. When in its upper position the hood collects fumes and cooking odors. The flue 70 extends to the upper edge of the flap 41 and is adapted to cooperatively engage an upper flue extension 77 provided with a weather cap 78, the extension being mounted upon the fixed portion 36 of the end wall. A shelf 79 is preferably mounted upon the inner surface of the portion 36 to provide means to support condiments and the like.

The burner is supplied with fuel such as butane gas from a fuel tank 80 mounted upon the outer surface of the flap 41 at its upper end and supported by bracket 81. Fuel may flow from the tank to the burner appliance through a supply tube 82 leading from a shut-off valve 83 and extending through the flap 41 to the burners. When the trailer is opened, but prior to elevating the rear wall, the valve 83 is readily accessible since it is on top of the tank 80. Even during very inclement weather the front wall may be released and partially lowered to give access to the valve.

The hood is preferably provided with a catch 84 and the burner appliance with a latch 85, the latch being engageable with the catch when the hood is in its lowered position thereby to maintain the hood against displacement during movement of the trailer.

It will be noted that the upper edges of the sheet 55 and of the link section 47 are deeply recessed as seen more clearly in Fig. 1 in order that the link sections may fold upon themselves and against the flap 41 when the front wall is elevated, the recesses giving clearance for the outwardly projecting flue 70.

During movement of the vehicle the pedestals 17 are collapsed and held in position against the lower surface of the base by suitable means such as chain 23 which also carries the locking member 24 for holding the front end of the roof in engagement with the base section. Other similar means (not shown) are provided at the rear of the trailer in order to maintain the roof in position. When it is desired to occupy the trailer the locking member 24 is first disengaged, whereupon the springs 60 cause the front end of the roof to raise slightly to the extent permitted by whatever other latching means are provided to hold the roof in position. Thereafter the rear end of the roof may be unlatched, whereupon the springs 60 continue to elevate the entire roof, the side walls being thereby caused partially to unfold. In continuation of the same movement the springs 32 and 33 complete the elevation of the roof section and the side walls. The rear end wall may now be elevated to brace the structure and to provide access to the interior of the trailer through the door provided therein. A person may enter the trailer and step forwardly in the aisle thereof between the storage structures at the sides in which the folding bunks are collapsed as illustrated in the aforesaid application, and may reach forward over the upper end of the lowered front wall to open the valve 83. Thereafter the front wall may be raised and locked in position by the latches 44. The flap 41 is then locked in position by means of the latches 43 and the structure is now ready for occupancy and use. Collapsing movement thereof is achieved by first releasing the latches 44 and 46 and lowering the front end wall. Thereafter the operator steps outside the trailer and lowers the rear end wall as described in the above-identified patent. The roof is then collapsed upon the base section by pulling inwardly on both side walls adjacent the rear hinges 20. It is sufficient merely to start the collapsing movement, the weight of the roof causing the collapsing movement to be completed. The collapsing movement is fairly rapid but not unduly so since during the collapsing movement the springs 32, 33 and 60 are tensioned. The roof will remain in slightly elevated position as illustrated in dotted line in Fig. 5 until the roof-latching means are engaged.

It will be noted that the roof will elevate itself once the latches are disengaged, yet paradoxically the roof will lower itself once an initial movement is imparted thereto by breaking the side walls inwardly. In the raising movement the completion thereof is due to the inertia of movement imparted thereto by the combination of springs which are fully loaded when the roof is fully lowered. During the lowering movement of the roof the completion of the lowering movement is due to the inertia of movement effected by the initial impetus given thereto upon breaking the side walls inwardly and due to the weight of the roof. It will be apparent that the springs should be properly designed to effect the raising movement and permit the lowering movement, and it will also be apparent that it may be necessary at times for a person to manually restrain the roof immediately upon its reaching the lowered position or the springs might operate again to cause the roof to be elevated. Likewise, the springs may be so designed and tensioned as to be incapable of initiating elevating movement without the assistance of a light manual force initially applied to the roof. In other words, the springs should be such as substantially to counterbalance the weight of the roof but may require slight additional manual assistance without departing from my invention.

Having illustrated and described a preferred embodiment of the invention, it should be apparent to those skilled in the art that the same permits of modification in arrangement and detail. All such modifications as come within the scope of the appended claims are considered to be a part of my invention.

I claim:

1. A collapsible trailer comprising a box-like base section, a roof section, articulated side walls hingedly connecting said sections together, said side walls being extended in upright positions when said roof section is raised and being folded inwardly when said roof section is lowered onto said base section, an end wall hinged at its lower edge to said base section and movable from an inwardly extending horizontal position to an upright position when said roof section and side walls are raised, an articulated structure comprising a plurality of rigid sections and a plurality of horizontally disposed hinge means connecting said rigid sections together, other horizontal hinge means connecting one end of said articulated structure to an intermediate portion of said end wall, and still other horizontally disposed hinge means connecting the other end of said articulated structure to said roof section, said rigid sections being arranged to collapse against each other and against said end wall when said end wall is upright, to swing away from each other and said end wall to a fully extended position when said end wall is lowered while said roof section remains in elevated position, and to partially collapse within said base section when said roof section is lowered, said rigid sections being of substantial width and being hinged to each other and to said end wall and said roof section in a substantial manner whereby to prevent side-swaying of said roof section and said side walls when elevated.

2. A collapsible trailer comprising a box-like base section, a roof section, articulated side walls hingedly connecting said sections together, said side walls being extended in upright positions when said roof section is raised and being folded inwardly when said roof section is lowered onto said base section, an end wall hinged at its lower edge to said base section and movable from an inwardly extending horizontal position to an upright position after said roof section and side walls are raised, an articulated structure comprising a plurality of rigid sections and a plurality of horizontally disposed hinge means connecting said rigid sections together, other horizontal hinge means connecting one end of said articulated structure to an intermediate portion of said end wall, and still other horizontally disposed hinge means connecting the other end of said articulated structure to said roof section, said rigid sections being arranged to collapse against each other and against said end wall when said end wall is upright, to swing away from each other and said end wall to a fully extended position when said end wall is lowered while said roof section remains in elevated position, and to partially collapse within said base section when said roof section is lowered, said rigid sections being of substantial width and being hinged to each other and to said end wall and said roof section in a substantial manner whereby to prevent side-swaying of said roof section and said side walls when elevated; in combination with spring means urging said articulated structure away from its partially collapsed position within said base section toward its extended position whereby to initiate elevating movement of said roof section and said side walls.

3. A collapsible trailer comprising a box-like base section, a roof section, inwardly foldable side walls hingedly connecting said base section to said roof section, an end wall, means hinging said end wall at its lower edge to said base section in such manner as to permit said end wall to swing inwardly to a horizontal position prior to collapsing movement of the roof section and side walls and to swing to an upright position after said side walls have been fully extended and said roof section elevated, said end wall having an opening in the lower portion thereof, a flap, horizontal hinge means connecting said flap to said end wall, said flap being movable from a depending position when said end wall is horizontally disposed to a position substantially closing said opening when said end wall is upright, first link means pivotally connected to said flap in a manner to extend outwardly therefrom or to swing into contact therewith extending away from the pivotal attachment of said flap to said end wall, and second link means pivotally connecting said first link means to said roof section, said first and second link means being arranged to fold upon themselves outside said end wall when said end wall is upright and also being arranged to force said flap into a downwardly depending position when said roof section is lowered.

4. A collapsible trailer comprising a box-like base section, a roof section, inwardly foldable side walls hingedly connecting said base section to said roof section, an end wall, means hinging said end wall at its lower edge to said base section in such manner as to permit said end wall to swing inwardly to a horizontal position prior to collapsing movement of the roof section and side walls and to swing to an upright position after said side walls have been fully extended and said roof section elevated, said end wall having an opening in the lower portion thereof, a flap, horizontal hinge means connecting said flap to said end wall, said flap being movable from a depending position when said end wall is horizontally disposed to a position substantially closing said opening when said end wall is upright, first link means pivotally connected to said flap in a manner to extend outwardly therefrom or to swing into contact therewith extending away from the pivotal attachment of said flap to said end wall, second link means pivotally connecting said first link means to said roof section, said first and second link means being arranged to fold upon themselves outside said end wall when said end wall is upright and also being arranged to force said flap into a downwardly depending position when said roof section is lowered, and spring means urging said roof section away from its lowered position in engagement with said base section.

5. A collapsible trailer comprising a box-like base section, a roof section, inwardly foldable side walls hingedly connecting said base section to said roof section, an end wall, means hinging said end wall at its lower edge to said base section in such manner as to permit said end wall to swing inwardly to a horizontal position prior to collapsing movement of the roof section and side walls and to swing to an upright position after said side walls have been fully extended and said roof section elevated, said end wall having an opening in the lower portion thereof, a flap, horizontal hinge means connecting said flap to said end wall, said flap being movable from a depending position when said end wall is horizontally disposed to a position substantially closing said opening when said end wall is upright, first link means pivotally connected to said flap in a manner to extend outwardly therefrom or to swing into contact therewith extending away from the pivotal attachment of said flap to said end wall, second link means pivotally connecting said first link means to said roof section, said first and second link means being arranged to fold upon themselves outside said end wall when said end wall is upright and also being arranged to force said flap into a downwardly depending position when said roof section is lowered, and spring means urging said roof section away from its lowered position in engagement with said base section, said spring means comprising a tension spring extending between said flap and said base section, said spring being tensioned when said flap is forced to its downwardly depending position by said link means.

6. A collapsible trailer comprising a box-like base section, a roof section, inwardly foldable side walls hingedly connecting said base section to said roof section, an end wall, means hinging said end wall at its lower edge to said base section in such manner as to permit said end wall to swing inwardly to a horizontal position prior to collapsing movement of the roof section and side walls and to swing to an upright position after said side walls have been fully extended and said roof section elevated, said end wall having an opening in the lower portion thereof, a flap, horizontal hinge means connecting said flap to said end wall, said flap being movable from a depending position when said end wall is horizontally disposed to a position substantially closing said opening when said end wall is upright, first link means pivotally connected to said flap in a manner to extend outwardly therefrom or to swing into contact therewith extending away from the pivotal attachment of said flap to said end wall, second link means pivotally connecting said first link means to said roof section, said first and second link means being arranged to fold upon themselves outside said end wall when said end wall is upright, and also being arranged to force said flap into a downwardly depending position when said roof section is lowered, first spring means associated with said link means for initially impelling said roof section away from its lowered position in engagement with said base section, and other spring means associated with said side walls and biased to complete the raising of said roof and side walls.

7. A collapsible trailer comprising a box-like base section, a roof section, inwardly foldable side walls hingedly connecting said base section to said roof section, an end wall, means hinging said end wall at its lower edge to said base section in such manner as to permit said end wall to swing inwardly to a horizontal position prior to collapsing movement of the roof section and side walls and to swing to an upright position after said side walls have been fully extended and said roof section elevated, articulated stabilizer means connecting said end wall to said roof section, first spring means operatively associated with said stabilizer means initially to elevate said roof, and other spring means operatively associated with said side walls to complete the elevation of said roof.

8. A collapsible trailer comprising a box-like base section, a roof section, inwardly foldable side walls hingedly connecting said base section to said roof section, an end wall, means hinging said end wall at its lower edge to said base section in such manner as to permit said end wall to swing inwardly to a horizontal position prior to collapsing movement of the roof section and side walls and to swing to an upright position after said side walls have been fully extended and said roof section elevated, said end wall having an opening in the lower portion thereof, a flap, horizontal hinge means connecting said flap at its upper edge to said end wall, said flap being movable from a depending position when said end wall is horizontally disposed to a position substantially closing said opening when said end wall is upright, a burner appliance on the inner surface of said flap, a burner fuel supply tank mounted on the outer surface of said flap, and a fuel tube extending from said supply tank through said flap to said burner appliance.

9. A collapsible trailer comprising a box-like base section, a roof section, inwardly foldable side walls hingedly connecting said base section to said roof section, an end wall, means hinging said end wall at its lower edge to said base section in such manner as to permit said end wall to swing inwardly to a horizontal position prior to collapsing movement of the roof section and side walls and to swing to an upright position after said side walls have been fully extended and said roof section elevated, said end wall having an opening in the lower portion thereof, a flap, horizontal hinge means connecting said flap at its upper edge to said end wall, said flap being movable from a depending position when said end wall is horizontally disposed to a position substantially closing said opening when said end wall is upright, a burner appliance on the inner surface of said flap, a burner fuel supply tank mounted on the outer surface of said flap, a fuel tube extending from said supply tank through said flap to said burner appliance, and a valve controlling the flow through said fuel tube, said valve being mounted on top of said tank.

10. A collapsible trailer comprising a box-like base section, a roof section, inwardly foldable side walls hingedly connecting said base section to said roof section, an end wall, means hinging said end wall at its lower edge to said base section in such manner as to permit said end wall to swing inwardly to a horizontal position prior to collapsing movement of the roof section and side walls and to swing to an upright position after said side walls have been fully extended and said roof section elevated, said end wall having an opening in the lower portion thereof, a flap, horizontal hinge means connecting said flap to said end wall, said flap being movable from a depending position when said end wall is horizontally disposed to a position substantially closing said opening when said end wall is upright, a burner appliance on the inner surface of said flap, a flue mounted upon the outer surface of said flap, and a hood detachably mounted on the inner surface of said flap and communicating with said flue.

11. A collapsible trailer comprising a box-like base section, a roof section, inwardly foldable side walls hingedly connecting said base section to said roof section, an end wall, means hinging said end wall at its lower edge to said base section in such manner as to permit said end wall to swing inwardly to a horizontal position prior to collapsing movement of the roof section and side walls and to swing to an upright position after said side walls have been fully extended and said roof section elevated, said end wall having an opening in the lower portion thereof, a flap, horizontal hinge means connecting said flap to said end wall, said flap being movable from a depending position when said end wall is horizontally disposed to a position substantially closing said opening when said end wall is upright, a burner appliance on the inner surface of said flap, a flue mounted upon the outer surface of said flap, said end wall having an opening therethrough communicating with said flue, and a spring-loaded damper normally closing said opening.

12. A collapsible trailer comprising a box-like base section, a roof section, inwardly foldable side walls hingedly connecting said base section to said roof section, an end wall, means hinging said end wall at its lower edge to said base section in such manner as to permit said end wall to swing inwardly to a horizontal position prior to collapsing movement of the roof section and side walls and to swing to an upright position after said side walls have been fully extended and said roof section elevated, said end wall having an opening in the lower portion thereof, a flap, horizontal hinge means connecting said flap to said end wall, said flap being movable from a depending position when said end wall is horizontally disposed to a position substantially closing said opening when said end wall is upright, a burner appliance on the inner surface of said flap, a burner fuel supply tank mounted on the outer surface of said flap, a flue mounted upon said flap, said end wall having a plurality of vertically spaced openings therethrough communicating with said flue, a plurality of spring-loaded dampers normally closing said openings, and a hood adapted to be selectively associated with said openings, said hood comprising means to open said dampers.

13. A collapsible trailer comprising a box-like base section, a roof section, inwardly foldable side walls hingedly connecting said base section to said roof section, an end wall, means hinging said end wall at its lower edge to said base section in such manner as to permit said end wall to swing inwardly to a horizontal position prior to collapsing movement of the roof section and side walls and to swing to an upright position after said side walls have been fully extended and said roof section elevated, said end wall having an opening in the lower portion thereof, a flap, horizontal hinge means connecting said flap to said end wall, said flap being movable from a depending position when said end wall is horizontally disposed to a position substantially closing said opening when said end wall is upright, a burner appliance on the inner surface of said flap, a flue mounted upon the outer surface of said flap, said end wall having a plurality of vertically spaced openings therethrough communicating with said flue, a plurality of spring-loaded dampers normally closing each of said openings, said dampers lying within said flue, and a hood including a portion insertable in either of said openings to maintain said hood above said burner appliance at either of a plurality of selectable positions, said portion being engageable with said dampers whereby to place said hood in communication with said flue.

HAROLD C. BRUMBAUGH.

References Cited in the file of this patent

UNITED STATES PATENTS

| Number | Name | Date |
|---|---|---|
| 521,628 | Wilkins | June 19, 1894 |
| 1,092,681 | Way | Apr. 7, 1914 |
| 1,917,824 | Burns | July 11, 1933 |
| 2,021,651 | Gutmann | Nov. 19, 1935 |
| 2,182,967 | Kors | Dec. 12, 1939 |

FOREIGN PATENTS

| Number | Country | Date |
|---|---|---|
| 484,501 | Great Britain | May 6, 1938 |